United States Patent
Miyanaga

[19]

[11] Patent Number: 5,810,523
[45] Date of Patent: Sep. 22, 1998

[54] APPARATUS FOR DRILLING A HOLE HAVING AN UNDERCUT SPACE

[75] Inventor: Masaaki Miyanaga, Ashiya, Japan

[73] Assignee: Kabushiki Kaisha Miyanaga, Hyogo, Japan

[21] Appl. No.: 814,489

[22] Filed: Mar. 10, 1997

Related U.S. Application Data

[63] Continuation-in-part of Ser. No. 587,395, Jan. 17, 1996, Pat. No. 5,735,650.

[30] Foreign Application Priority Data

Feb. 28, 1995 [JP] Japan ............................. HEI 7-40131
Mar. 13, 1996 [JP] Japan ................................... 8-055820

[51] Int. Cl.$^6$ .................................................. B23B 51/00
[52] U.S. Cl. ........................... 408/153; 82/1.12; 408/159; 408/180; 408/225
[58] Field of Search ................................ 408/153, 156, 408/159, 173, 178, 180, 225, 224; 82/1.2, 1.5

[56] References Cited

U.S. PATENT DOCUMENTS

| | | | |
|---|---|---|---|
| 1,536,208 | 5/1925 | Gosper .................................... | 82/1.5 |
| 2,379,497 | 3/1945 | Fried et al. ............................. | 408/156 |
| 2,855,812 | 10/1958 | Fried ........................................ | 408/153 |
| 3,696,454 | 10/1972 | Youtz et al. ........................ | 408/153 X |
| 4,147,463 | 4/1979 | Robinson ................................ | 408/156 |
| 4,345,559 | 8/1982 | Johnson ............................. | 175/286 X |
| 4,402,642 | 9/1983 | Klancnik et al. ......................... | 414/18 |
| 4,446,934 | 5/1984 | Müller . | |
| 4,462,726 | 7/1984 | Silvey et al. ............................... | 408/76 |
| 4,635,737 | 1/1987 | Miyanaga et al. ...................... | 175/284 |
| 4,992,010 | 2/1991 | Fischer ...................................... | 82/1.5 |
| 4,998,981 | 3/1991 | Miyanaga ................................ | 175/286 |
| 5,310,012 | 5/1994 | Centre et al. ....................... | 175/269 X |
| 5,462,393 | 10/1995 | Eischeid ................................... | 408/159 |
| 5,544,989 | 8/1996 | Erath ....................................... | 408/159 |

FOREIGN PATENT DOCUMENTS

| | | |
|---|---|---|
| 69276 A | 1/1983 | European Pat. Off. . |
| 0 395 335 A1 | 10/1990 | European Pat. Off. . |
| 395335 A | 10/1990 | European Pat. Off. . |
| 729802 A | 9/1996 | European Pat. Off. . |
| 21 48 654 | 4/1972 | Germany . |
| 2921696 A | 12/1980 | Germany . |
| 58-50855 | 11/1983 | Japan . |
| 63-150102 | 6/1988 | Japan . |
| 1-10173 | 3/1989 | Japan . |
| 1-18329 | 5/1989 | Japan . |
| 1-29646 | 6/1989 | Japan . |
| 2-39688 | 10/1990 | Japan . |
| 2-281907 | 11/1990 | Japan . |
| 4-11766 | 3/1992 | Japan . |
| 518688 | 5/1940 | United Kingdom . |
| 1184106 | 4/1968 | United Kingdom . |
| 1 345 923 | 2/1974 | United Kingdom . |
| 2 157 207 | 10/1985 | United Kingdom . |

*Primary Examiner*—Daniel W. Howell
*Assistant Examiner*—Toan Le
*Attorney, Agent, or Firm*—Marshall, O'Toole, Gerstein, Murray & Borun

[57] ABSTRACT

It is the object of the present invention to drill a hole and, at the same time, transmitting an application force exactly to an undercutter for forming an undercut space in the cylindrical wall of the hole at a position near the hole bottom. An apparatus according to the present invention includes a rear circular member 1, a sleeve 10 supported in telescopic engagement with the rear member 1, an undercutter 5, and a front annular member 15 linking and movable with the undercutter 5. The sleeve 10 has an inner flange 13 forward from the rear member 1. An application force transmission mechanism 18 comprises a cam 20 supported by the rear member 1. The cam 20 has a pair of steps 21 and 22. The transmission mechanism 18 also comprises a first impact transmission rod 23 extending between the cam step 21 and sleeve flange 13, and a second impact transmission rod 24 extending between the step 22 and front member 15.

3 Claims, 4 Drawing Sheets

APPARATUS FOR DRILLING A HOLE HAVING AN UNDERCUT SPACE

This is a continuation-in-part of application Ser. No. 08/587,395, filed Jan. 17, 1996, now U.S. Pat. No. 5,735,650.

FIELD AND BACKGROUND OF THE INVENTION

The present invention relates to an apparatus, or a borer, for drilling a hole of predetermined depth in an object such as concrete and, at the same time, forming an undercut space or flared portion with enlarged diameter in the cylindrical wall of the hole at a deep position.

An anchor bolt can be planted in a drilled hole of predetermined depth in the object such as concrete, inserting into the hole a base portion of the bolt with an axially slitted sleeve which surrounds the bolt, and expanding the sleeve to create frictional resistance on the hole wall.

The pull-out resisting strength of the planted bolt depends greatly on the joining (bonding) strength between the expanded sleeve and the hole wall. It is therefore possible to largely increase the pull-out resisting strength by forming, in advance, an undercut conical space having enlarged diameter near the bottom of the hole for engagement with the expanded sleeve.

There are conventional methods and apparatuses for drilling a hole having an undercut space in concrete by a boring machine such as a hammer drill for drilling a straight hole of predetermined depth, and then forming an undercut space in the hole wall near the bottom.

The applicant's Japanese Patent Application No. Hei 7-40131 (corresponding to U.S. Ser. No. 08/587,395) discloses an apparatus of this type for drilling a hole having an undercut space. This apparatus includes a basic member having an outer cylindrical surface and a coaxial shank at its rear end. A sleeve is supported in telescopic engagement with the outer surface of the basic member. The sleeve has an inner flange or an end wall at its front end. A drill spindle is fixed coaxially to the front end of the basic member, and extends through the sleeve flange. The spindle has an axial groove on its outer surface. The front end of the groove bottom slopes outward. An undercutter engages slidably with the groove, and has an undercutting edge at its front end. An annular member is positioned coaxially between the basic member and the sleeve flange, and between the cylindrical wall of the sleeve and the spindle. The annular member engages with the undercutter to move axially with it. A pull-up spring is interposed between the sleeve and the undercutter to bias the undercutter and the annular member rearward relative to the sleeve. An application force transmission mechanism links the sleeve and the annular member together.

After the sleeve flange comes into contact with a surface of an object being drilled, the sleeve stops forward movement, and the basic member continues forward movement. The forward movement of the basic member relative to the sleeve is converted by the application force transmission mechanism into forward movement of the undercutter relative to the spindle. This movement slides the undercutter and protrudes the undercutting edge outward from the sloped surface of the sloped groove bottom. The protruded undercutting edge cuts the cylindrical wall of the drilled hole to form an undercut space. It is therefore possible to form, continuously in one process, a drilled hole of predetermined depth in the object and, at the same time, an undercut space in the cylindrical wall of the drilled hole.

The application force transmission mechanism may include a train of balls put in an inverted U-shaped hole formed through the basic member. This hole has open ends at the front end of the basic member. The balls at both ends of the train abut on the rear ends of a pair of connecting rods respectively, which extend axially through the respective ends of the hole. One of the rods extends slidably through the annular member, and abuts at its front end on the sleeve flange. The other rod abuts at its front end on the annular member. If such a transmission mechanism is applied to a hammer drill with axial vibration, the balls may become bumpy or unstable in the U-shaped hole. In such a case, after the sleeve flange abuts on the surface of a body being drilled, it becomes difficult to accurately convert the forward movement of the basic member relative to the sleeve into forward movement of the undercutter relative to the spindle.

SUMMARY OF THE INVENTION

The present invention solves the foregoing problem with an application force transmission mechanism including a cam supported by the basic member of a borer, in place of the balls in the U-shaped hole.

By providing a borer of the type mentioned above with an application force transmission mechanism including a cam, which can turn on an axis, it is possible to reduce the number of parts. It is also possible to reduce the backlash between parts, so that the forward movement of the basic member relative to the sleeve can be converted accurately into forward movement of the undercutter relative to the spindle.

An apparatus according to the present invention for drilling a hole having an undercut space includes a shank and a first circular member, which is fixed at its rear end coaxially to the shank. A stopper is fixed to the periphery of the first member. A sleeve engages telescopically with the first member. The sleeve has an axial slot in slidable engagement with the stopper. The sleeve also has an inner flange forward from the first member. A drill spindle is fixed coaxially to the front end of the first member, and extends through the sleeve flange. An undercutter engages with the side wall of the spindle slidably therealong through the sleeve flange. A second circular member is positioned coaxially between the first member and the sleeve flange, and between the cylindrical wall of the sleeve and the spindle. The annular member engages with the undercutter to axially move therewith. A spring is interposed between the sleeve and either the undercutter or the second member to bias the undercutter and the second member rearward. An application force transmission mechanism links the sleeve and the second member.

The transmission mechanism includes a pin fixed to the first member. The pin extends perpendicularly to the axis of the first member. The transmission mechanism also includes a cam supported rotatably by the pin. The cam has a pair of steps on both sides of the pin. The steps face in the same direction. The transmission mechanism further includes a first rod and a second rod. The first rod extends axially through the second member. The first rod abuts at its rear end on one of the cam steps, and at its front end on the sleeve flange. The second rod extends axially of the first member. The second rod abuts at its rear end on the other cam step, and at its front end on the second member.

During operation, the spindle fixed to the first member drills a hole in a body. When the sleeve flange has come into contact with the surface of the object being drilled, the sleeve stops forward movement, and the first member continues forward movement. The forward movement of the first member relative to the sleeve moves the first rod rearward, turns the cam and moves the second rod forward. The second rod then moves the second member together with the undercutter forward relatively to the spindle. Consequently, the undercutter can, always with the same stroke, form an undercut space in the cylindrical wall of the drilled hole at a deep position of the hole.

It is preferable to arrange or position a pair of such application force transmission mechanisms symmetrically with respect to the axis of the first member.

In other words, it is preferable to convert, at two locations in symmetry with respect to the axis of the first member, the forward movement of the first member relative to the sleeve into forward movement of the second member away from the first member. This makes the operation smoother and improves the rotational balance of the apparatus.

It is also preferable to position the steps of the cam symmetrically with respect to the pin.

BRIEF DESCRIPTION OF THE DRAWINGS

A preferred embodiment of the present invention will be described in detail with reference to the accompanying drawings, in which.

DETAILED DESCRIPTION OF THE EMBODIMENT

With reference to the drawings, the borer of the present invention includes a shank 2 coupled to a rotating drive shaft (not shown). An upper or a first annular member 1 is fixed coaxially to the lower end of the shank 2. A drill spindle 3 is fixed at its upper end coaxially to the annular member 1. The spindle 3 has drill edge 4 at its lower end, which are the same as a known drill for drilling an ordinary straight hole.

Figure 1:
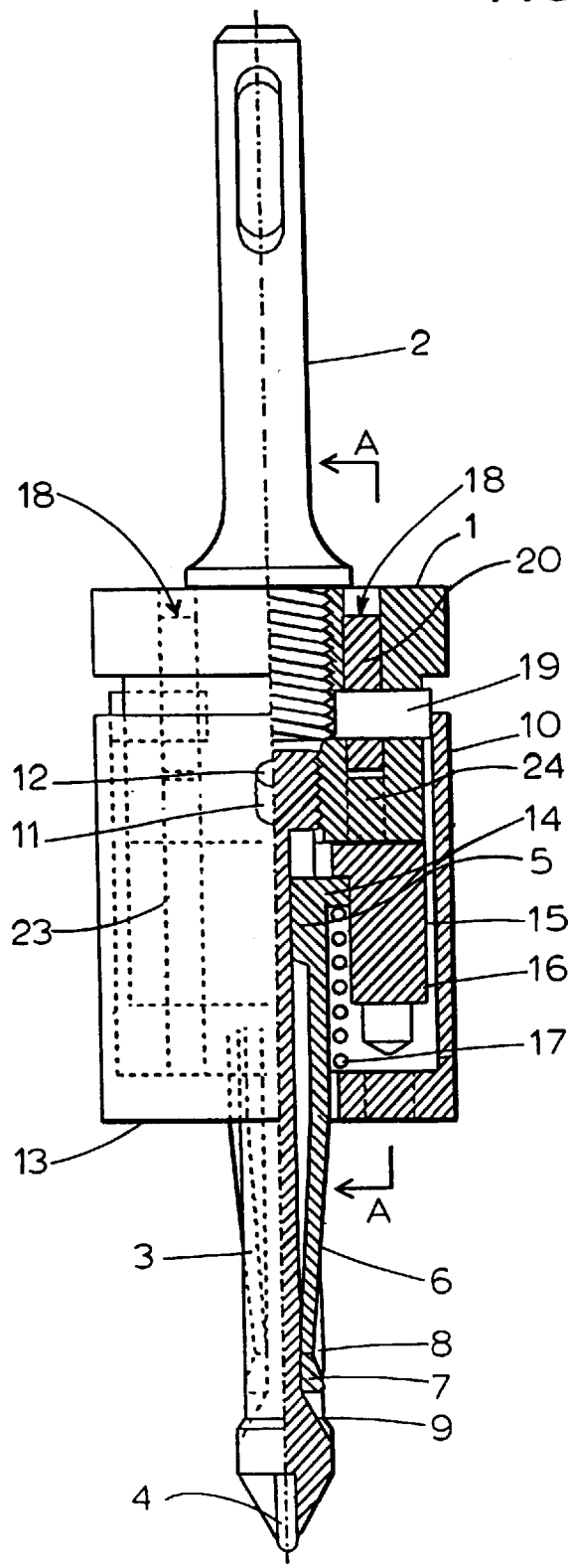
FIG. 1 is a side view partially in cross section of a borer according to the present invention.
Figure 2:
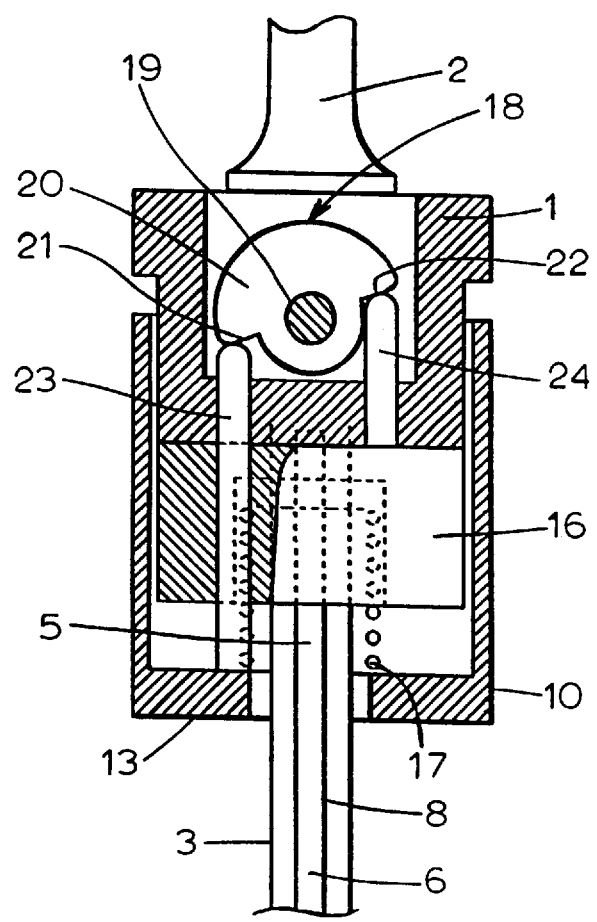
FIG. 2 is a cross section taken along line A—A of FIG. 1.

The drill spindle 3 has a pair of axial guide grooves 8 formed on its outer surface. An undercutter 5 engages with each of the grooves 8 slidably within a predetermined range therealong. The undercutter 5 includes a lower blade 6 having proper resiliency. An undercuting edge 7 is formed at the lower end of the blade 6. The bottom side of each groove 8 terminates at its lower end in a slope 9 inclined outward. Normally, as shown in FIG. 1, the undercutting edge 7 is retracted within the groove 8.

A sleeve 10 has an open upper end, and can telescopically slide on a lower portion of the annular member 1. The sleeve 10 also has a pair of axial slots 1 1 (only one shown) formed through its cylindrical wall. A pair of stoppers or radial pins 12 (only one shown) are fixed to the side wall of the annular member 1, and each engage slidably with one of the slots 11. The sleeve 10 includes an inner flange or lower end wall 13 having a center hole, through which the spindle 3 and undercutters 5 extend.

A lower or a second annular member 15 is positioned and can reciprocate coaxially between the upper annular member 1 and the sleeve end wall 13. The lower member 15 includes an inner flange formed at its upper end and a skirt or lower peripheral portion 16. The flange movably surrounds the spindle 3, and rests on or engages with the upper end portions 14 of the undercutters 5.

A pull-up spring 7 surrounds the undercutters 5 and spindle 3 between the sleeve end wall 13 and the undercutter end portion 14. The spring 17 biases or urges the undercutters 5 and the lower annular member 15 upward relatively to the sleeve 10, upper annular member 1 and spindle 3. Normally, the annular members 1 and 15 abut on each other, and the undercutting edge 7 are retracted in the guide grooves 8.

The upper annular member 1 has a pair of axially extending spaces formed therein. A radial pin 19 extends through each of the spaces, and is fixed to the upper member 1. A pair of application force transmission mechanisms 18 is provided to link the sleeve 10 and lower annular member 15 together. The transmission mechanisms 18 each include a cam 20 supported rotatably on the pin 19 in one of the spaces. The cam 20 has a pair of steps 21 and 22 facing downward on both sides of the associated pin 19. The steps 21 and 22 engage with the upper ends of impact transmission rods 23 and 24 respectively, which extend axially of the borer. The first or the longer rod 23 extends through part of the upper annular member 1 and through the lower member 15, and abuts at its lower end on the sleeve end wall 13. The second or the shorter rod 24 extends through part of the upper member 1, and abuts at its lower end on the upper surface of the lower member 15.

Normally, the lower annular member 15 is biased upward on the lower surface of the upper member 1. This lifts the shorter rods 24, turning the cams 20 to push down the longer rods 23.

The operation of the borer will be explained with reference to FIGS. 3 and 4.

Figures 3A, 3B:
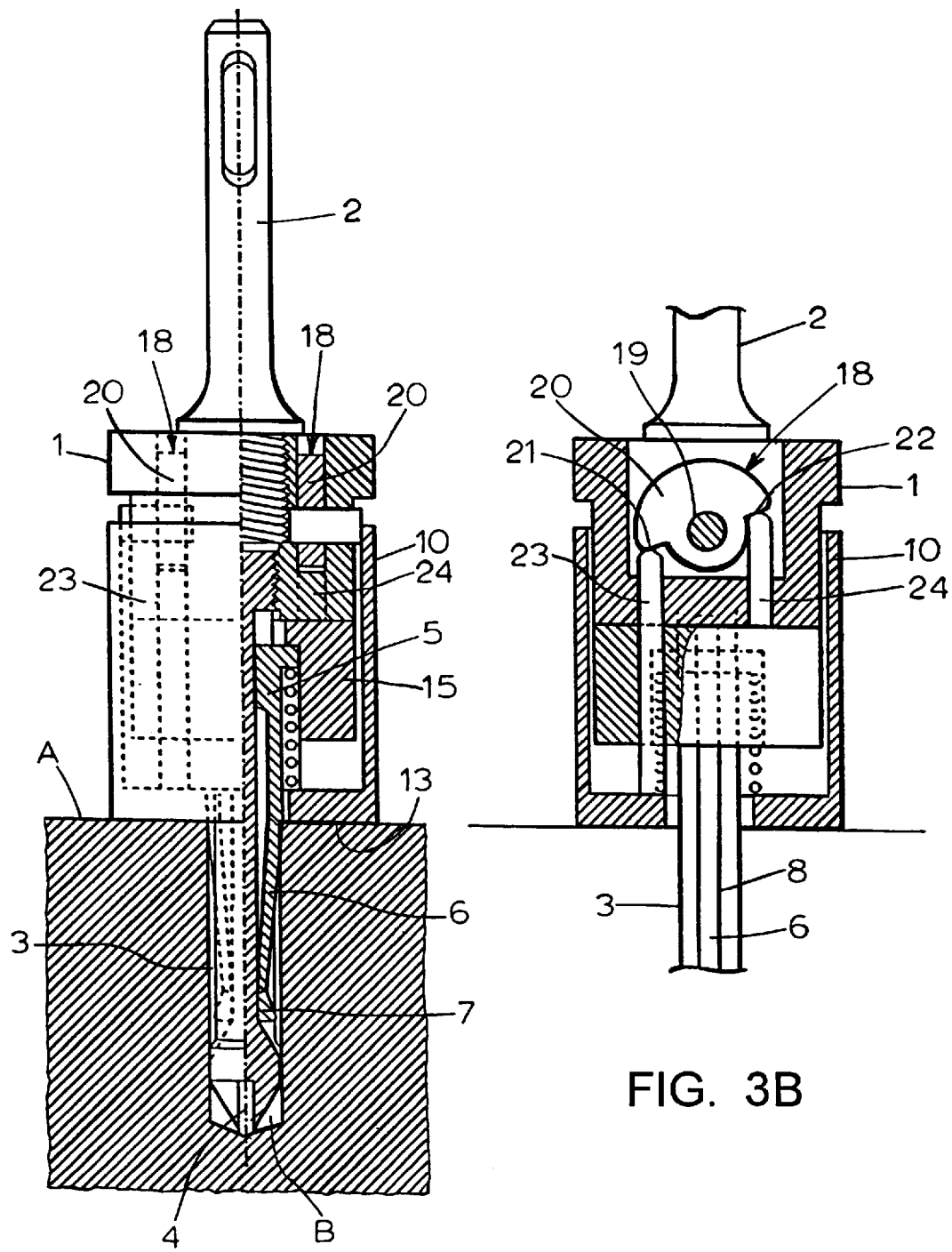
FIGS. 3a, 3b, 4a, and 4b are views similar to FIGS. 1 and 2, but showing how to bore with the borer of the present invention.

With reference to FIG. 3, the borer is rotated and pushed down against concrete A, so that the drilling edge 4 drill a straight hole B in the concrete. When the hole B has reached the predetermined depth with the sleeve end wall 13 abutting on the upper surface of the concrete A, the sleeve 10 and the longer rods 23 stop lowering.

Figures 4A, 4B:
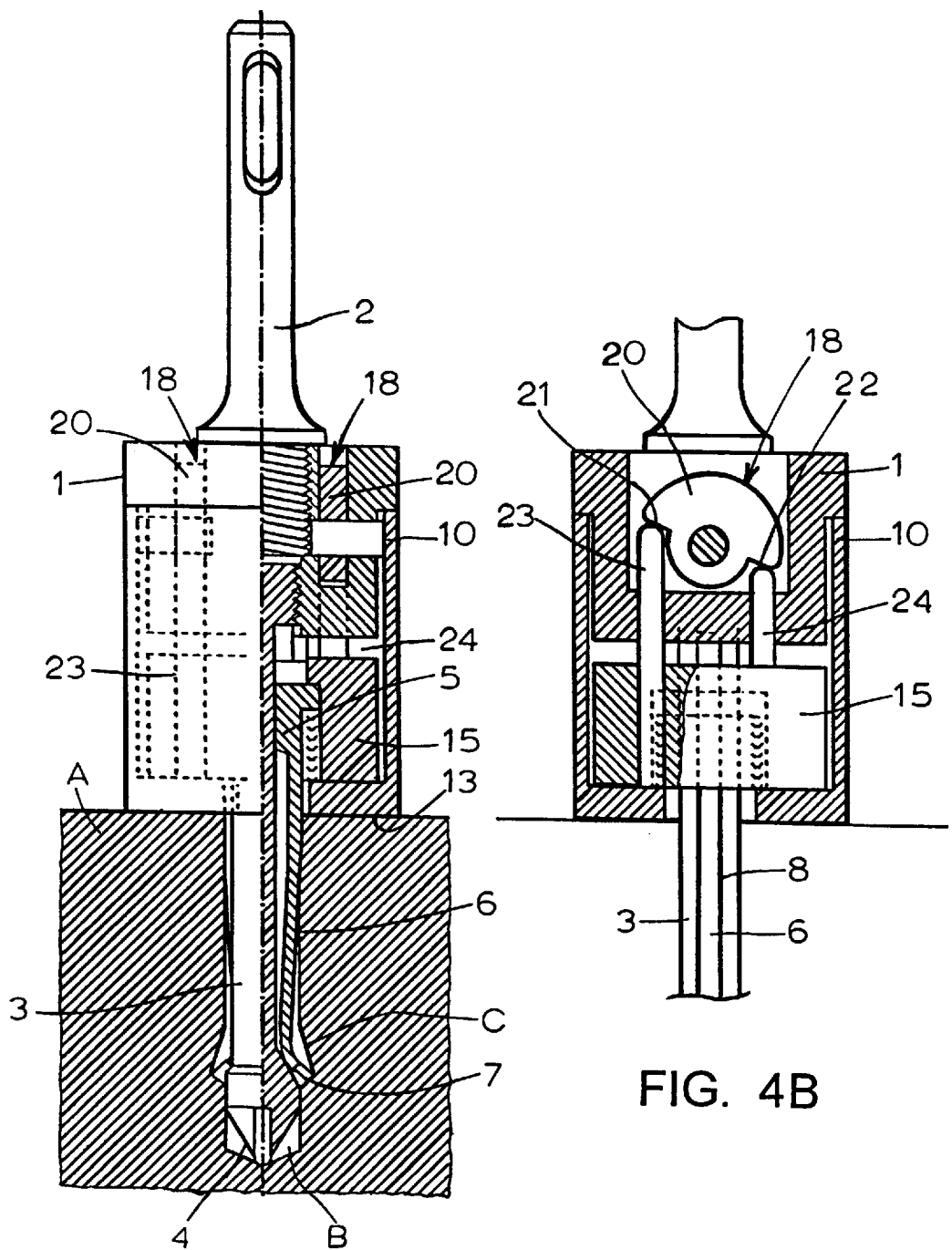

With reference to FIG. 4, the borer is kept rotating and being pushed down after the sleeve 10 stops lowering. As a result, the drill spindle 3 and the upper annular member 1 move down relatively to the sleeve 10 and the longer rods 23, while the drilling teeth 4 keep drilling the hole B. Consequently, the longer rods 23 push the cam steps 21, turning the cams 20 to lower the shorter rods 24. This lowers the lower annular member 15 together with the undercutters 5 against the force of the spring 17 relatively to the upper member 1 and the spindle 3. The undercutting edge 7 slide down along the spindle groove slopes 9, and protrude outward from the spindle 3 to cut the cylindrical wall of the drilled hole B.

When the skirt 16 of the lower annular member 15 has reached the sleeve end wall 13, the undercutters 5 stop lowering, with their edge 7 positioned at the most protruded points on the spindle 3. This completes the cutting of a conical undercut space C in the cylindrical wall of the hole B. Thus conical wall of the space C widens downward.

Thereafter, when the borer is released from the pushing down force, the spring 17 lifts the undercutters 5 and the lower annular member 15. As a result, the sleeve 10 returns to its original position, and the undercutting edges 7 retract from the slopes 9 into the guide grooves 8. Then, the borer is lifted to pull the spindle 3 out of the hole B. This completes the boring operation.

The present invention requires at least one application force transmission mechanism for converting the downward movement of the upper annular member relative to the stopped sleeve into the downward movement of the undercutters relative to the spindle during the boring operation.

The transmission mechanism is constituted by each of the cams and the associated rods. Consequently, the transmission mechanism needs only a small number of parts. In addition, the backlashes between parts can be reduced and can accurately transmit the application force. Therefore, when the present invention is applied to a hammer drill or the like, it can, always with the same cutting stroke, drill holes having an undercut space efficiently in a simple manner.

By arranging the two transmission mechanisms symmetrically with respect to the axis of the borer, it is possible to improve the borer operation smoothness. It is also possible to improve the borer rotation balance and reduce the borer instability, so that efficient boring can be made by high speed rotation.

The steps of each cam are symmetric with respect to the pin supporting it. As a result, the cutting stroke of the undercutting edge can be secured irrespective of the properties of the object or material to be cut. Consequently, the high cutting performance of the undercutting edge can be obtained.

What is claimed is:

1. An apparatus for drilling a hole having an undercut space, said apparatus comprising:

a shank;

a first circular member fixed at its rear end coaxially to said shank;

a stopper fixed to the periphery of said first member;

a sleeve in telescopic engagement with said first member, said sleeve having an axial slot in slidable engagement with said stopper, said sleeve also having an inner flange forward from said first member;

a drill spindle fixed coaxially to the front end of said first member, said spindle extending through said sleeve flange;

an undercutter engaging with the side wall of said spindle slidably therealong through said sleeve flange;

a second circular member positioned coaxially between said first member and said sleeve flange and between the cylindrical wall of said sleeve and said spindle, said annular member engaging with said undercutter to axially move therewith;

a spring interposed between said sleeve flange and either of said undercutter and said second member to bias said undercutter and said second member rearward;

a pin fixed to said first member, said pin extending perpendicularly to the axis of said first member;

a cam supported rotatably by said pin, said cam having a pair of steps on both sides of said pin, said steps facing in the same direction;

a first rod extending axially through said second member, said first rod abutting at its rear end on one of said cam steps and at its front end on said sleeve flange; and a second rod extending axially of said first member, said second rod abutting at its rear end on the other cam step and at its front end on said second member.

2. An apparatus for drilling a hole having an undercut space, said apparatus comprising:

a shank;

a first circular member fixed at its rear end coaxially to said shank;

a stopper fixed to the periphery of said first member;

a sleeve in telescopic engagement with said first member, said sleeve having an axial slot in slidable engagement with said stopper, said sleeve also having an inner flange forward from said first member;

a drill spindle fixed coaxially to the front end of said first member, said spindle extending through said sleeve flange;

an undercutter engaging with the side wall of said spindle slidably therealong through said sleeve flange;

a second circular member positioned coaxially between said first member and said sleeve flange and between the cylindrical wall of said sleeve and said spindle, said annular member engaging with said undercutter to axially move therewith;

a spring interposed between said sleeve and either of said undercutter and said second member to bias said undercutter and said second member rearward;

a pair of pins fixed to said first member, said pins extending perpendicularly to the axis of said first member;

a pair of cams supported rotatably by one of said pins, each of said cams having a pair of steps on both sides of the associated pin, said steps facing in the same direction;

a pair of first rods extending axially through said second member, each of said first rods abutting at its rear end on one of said steps of one of the cams and at its front end on said sleeve flange; and a pair of second rods extending axially of said first member, each of said second rods abutting at its rear end on the other step of one of said cams and at its front end on said second member.

3. An apparatus according to claim 1, wherein said cam steps are positioned symmetrically with respect to said pin.

* * * * *